United States Patent [19]

Shimizu

[11] Patent Number: 5,482,453

[45] Date of Patent: Jan. 9, 1996

[54] UTENSIL FOR MOLDING SUSHI RICE FOR USE IN PREPARING NIGIRI-ZUSHI

[75] Inventor: Yoshio Shimizu, Toyonaka, Japan

[73] Assignee: Kabushiki Kaisha Sushitaro, Toyonaka, Japan

[21] Appl. No.: 137,469

[22] Filed: Oct. 18, 1993

[30] Foreign Application Priority Data

Oct. 19, 1992 [JP] Japan ................. 4-072703 U

[51] Int. Cl.⁶ .............. A47J 43/20; B29C 33/20
[52] U.S. Cl. .............. 425/330; 249/82; 249/162; 425/395; 425/408; 425/410; 425/411; 426/512
[58] Field of Search ................. 425/408, 410, 425/411, 395, 233, 330; 426/512; 249/82, 158, 162, 161

[56] References Cited

U.S. PATENT DOCUMENTS

| | | | |
|---|---|---|---|
| 803,092 | 10/1905 | Bueckermann | 425/411 |
| 4,971,543 | 11/1990 | Minor | 425/411 |
| 5,135,382 | 8/1992 | Tsuchiya et al. | 425/411 |

FOREIGN PATENT DOCUMENTS

| | | |
|---|---|---|
| 60-130358 | 7/1985 | Japan . |
| 63-233755 | 9/1988 | Japan . |
| 574293 | 3/1993 | Japan . |
| 2163696 | 7/1985 | United Kingdom . |

Primary Examiner—Tim Heitbrink
Assistant Examiner—Joseph Leyson
Attorney, Agent, or Firm—Armstrong, Westerman, Hattori, McLeland & Naughton

[57] ABSTRACT

Disclosed is a utensil for molding sushi rice for use in preparing nigiri-zushi, the molding utensil having a split mold having a mold member, and an outer frame for the split mold to removably fit in, the molding utensil being characterized in that the utensil is provided with a pair of vertically split side mold members forwardly movable toward each other within the outer frame, each of the side mold members is provided on each of their opposite end walls with one of pairing elements provided by an angular cam and a pin for advancing the side mold member by about 5 mm, the other pairing element is provided on a wall of the upper mold member to be opposed to the end wall, the outer frame has such a depth that molding cavities having their contours defined by the lower mold member inserted into the outer frame to its bottom, the upper mold member pushed into the outer frame and fitted to the inserted lower mold member and the side mold members in a forwardly moved position within the outer frame have a combined volume about 25 to about 35% smaller than the volume of a recess defined by the outer frame, the lower mold member fitted into the outer frame to its bottom and the side mold members in a retracted position within the outer frame,

6 Claims, 7 Drawing Sheets

UTENSIL FOR MOLDING SUSHI RICE FOR USE IN PREPARING NIGIRI-ZUSHI

BACKGROUND OF THE INVENTION

1. Field of the Invention

The present invention relates to a utensil for molding sushi rice for use in preparing nigiri-zushi (slightly vinegared oval-shaped rice balls with sliced raw fish, etc. on), and more particularly to a utensil for molding sushi rice which has a split mold comprising a lower mold member and an upper mold member, and an outer frame for the split mold to removably fit in.

Cooked sushi rice is molded with a utensil of the type mentioned by placing the lower mold member into the outer frame, filling the sushi rice into a recess defined by the outer frame and the lower mold member, leveling the top of the mass of rice flush with the upper edge of the outer frame as by a bar, inserting the upper mold member into the outer frame and pushing down the upper mold member until the mold member fits to the lower mold member, whereby the sushi rice is molded in conformity with the shape of the mold cavity. The rice molding is then taken out from the utensil, and flesh or fish, shellfish or the like is placed on the molding to prepare nigiri-zushi.

2. Description of the Prior Art

Such sushi rice molding utensils for nigiri-sushi are well known. The molding utensil of the prior art has such a depth that the recess defined by the outer frame as placed on the flat surface of a cooking table or the like and the lower mold member inserted into the outer frame has approximately twice the volume of the cavity formed inside the outer frame by pushing down the upper mold member until the mold member fits to the lower mold member. The sushi rice molded with the utensil is compressed to excess and therefore greatly differs from the sushi rice hand-rolled by a skilled sushi cook in compactness and taste.

SUMMARY OF THE INVENTION

An object of the present invention is to provide a utensil for molding sushi rice for use in preparing nigiri-zushi which is usable by any person for molding sushi rice with the same compactness as when it is hand-rolled by a skilled cook to make tasty rice moldings as desired.

To fulfill the above and other objects, the present invention provides a utensil for molding sushi rice for use in preparing nigiri-zushi, the molding utensil having a split mold comprising a lower mold member and an upper mold member, and an outer frame for the split mold to removably fit in, the molding utensil being characterized in that the utensil is provided with a pair of vertically split side mold members forwardly movable toward each other within the outer frame, each of the side mold members being provided on each of opposite end walls thereof with one of pairing elements provided by an angular cam and a pin for advancing the side mold member by about 5 mm, the other pairing element being provided on a wall of the upper mold member to be opposed to the end wall, the outer frame having such a depth that molding cavities having their contours defined by the lower mold member inserted into the outer frame to the bottom thereof, the upper mold member pushed into the outer frame and fitted to the inserted lower mold member and the side mold members in a forwardly moved position within the outer frame have a combined volume about 25 to about 35% smaller than the volume of a recess defined by

2 the outer frame, the lower mold member fitted into the outer frame to the bottom thereof and the side mold members in a retracted position within the outer frame.

DESCRIPTION OF THE PREFERRED EMBODIMENTS

The drawings show a molding utensil which includes a split mold 1 and an outer frame 2. The split mold 1 comprises a lower mold member 11 and an upper mold member 12. The outer frame 2 is rectangular and has its upper and lower sides left open for the split mold 1 to be freely inserted thereinto or withdrawn therefrom.

With the illustrated embodiment, each of the lower mold member 11 and the upper mold member 12 of the split mold 1 has eight molding cavities 50 as divided by partitions 3 whereas the lower mold member 11, as well as the upper mold member 12, may have a suitable number of molding cavities 50 or one cavity 50.

Figure 1A:
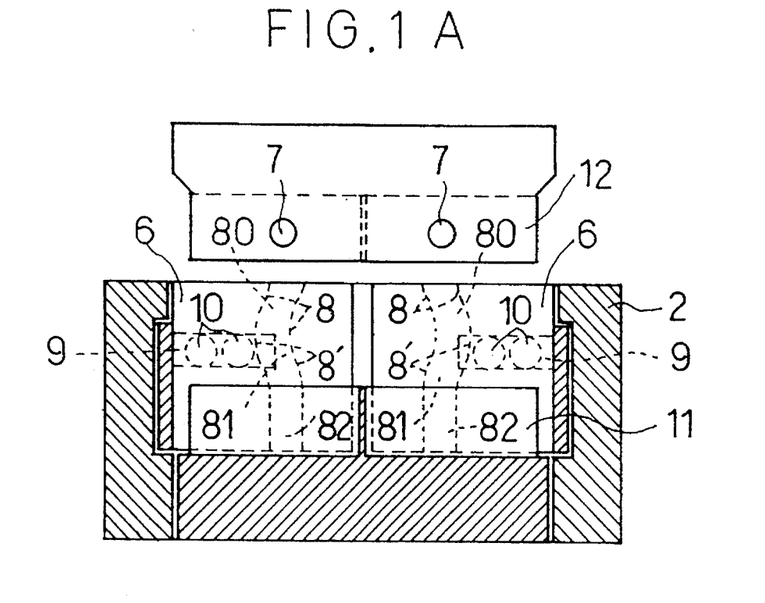
FIG. 1A is a view in cross section showing an embodiment of the invention before an upper mold member is inserted into an outer frame.
Figure 1B:
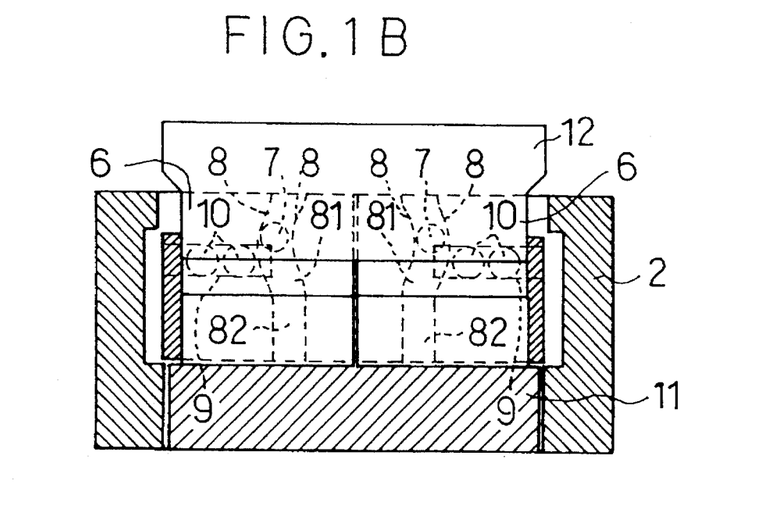
FIG. 1B is a view in cross section showing the embodiment with the upper mold member placed into the outer frame and pushed down to an intermediate position.
Figure 2:
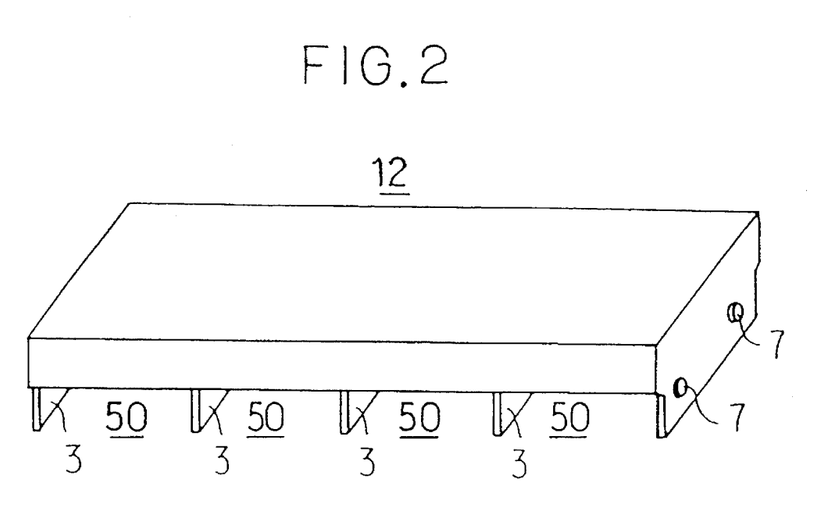
FIG. 2 is a perspective view of the upper mold member of the embodiment, i.e., molding utensil, shown in FIG. 1.
Figure 3A:
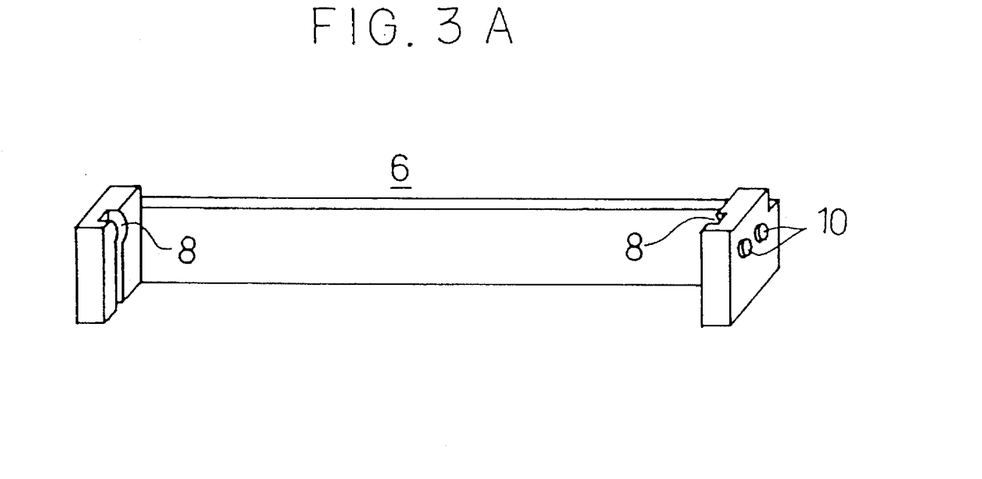
FIG. 3A is a perspective view showing one of a pair of side mold members included in the molding utensil.
Figure 3B:
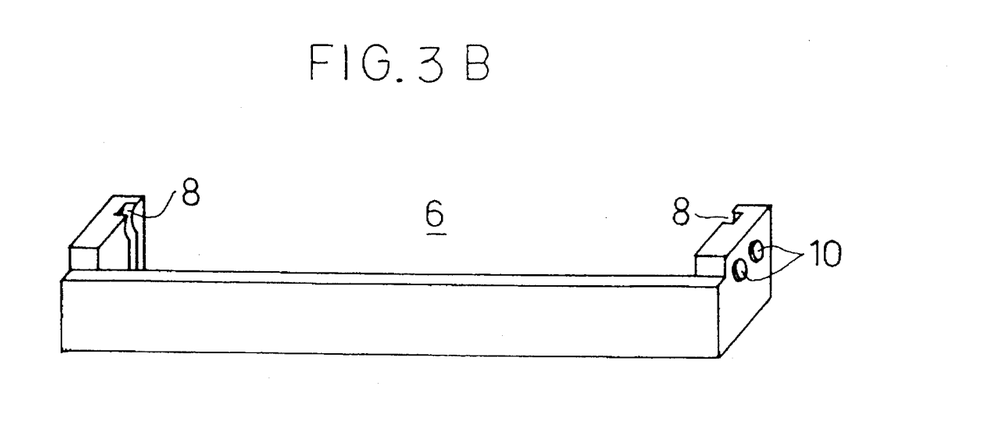
FIG. 3B is a perspective view showing the other side mold member.
Figure 4:
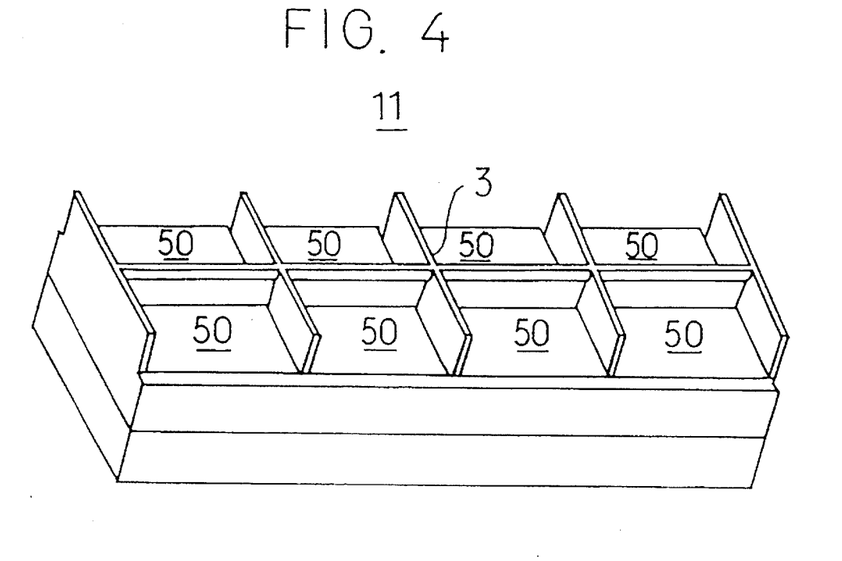
FIG. 4 is a perspective view of a lower mold member included in the molding utensil.
Figure 5:
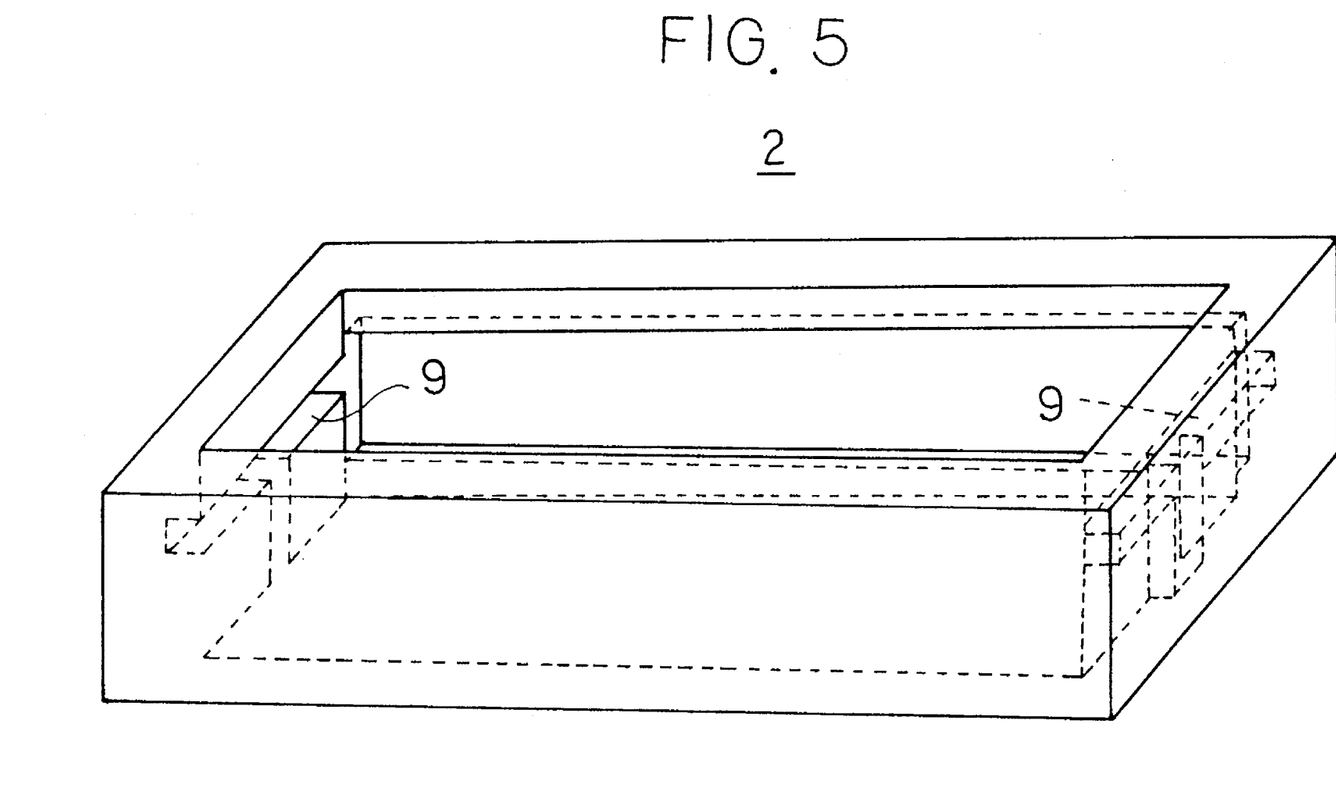
FIG. 5 is a perspective view of the outer frame of the molding utensil.

The molding utensil comprising the combination of split mold 1 and the outer frame 2 has a pair of vertically split side mold members 6, 6 opposed to each other within the outer frame 2 and movable forward and rearward (rightward and leftward in FIGS. 1, A and B).

Each of opposite end walls of each of the side mold members 6, 6 is provided with one of an angular cam 8 and a pin 7 serving as pairing elements, for example, the angular cam. The angular cam 8 is inclined downward as it extends from the front rearward away from the other side mold member 6 opposed thereto. The other pairing element, i.e., the pin 7, is provided on the wall of the upper mold member 12 which wall is opposed to the end wall. The cam 8 is in the form of a groove 80 for the outer end of the pin 7 to fit in as illustrated. As shown in FIG. 1, a groove 81 providing an angular cam 8' and inclined in a direction opposite to the direction of the cam 8 may continuously extend downward from the groove 80 providing the cam 8 with a vertical groove 82 continuously extending from the groove 81. In the case where the upper and lower angular cams 8, 8' are thus formed continuously in the end wall, the cam 8 is formed in the upper half of a vertical range of the wall corresponding to the depth as measured from the upper face of the outer frame 2 to the upper face of the lower mold member 11 fitted in the outer frame 2 to the bottom thereof, and the cam 8' is formed in the lower half of the vertical range.

When required, each of opposite inner end surfaces of the outer frame 2 and the wall surface of each side mold member 6 facing the end surface can be formed respectively with a lateral groove 9 and pins 10 fitting therein.

Figure 6A:
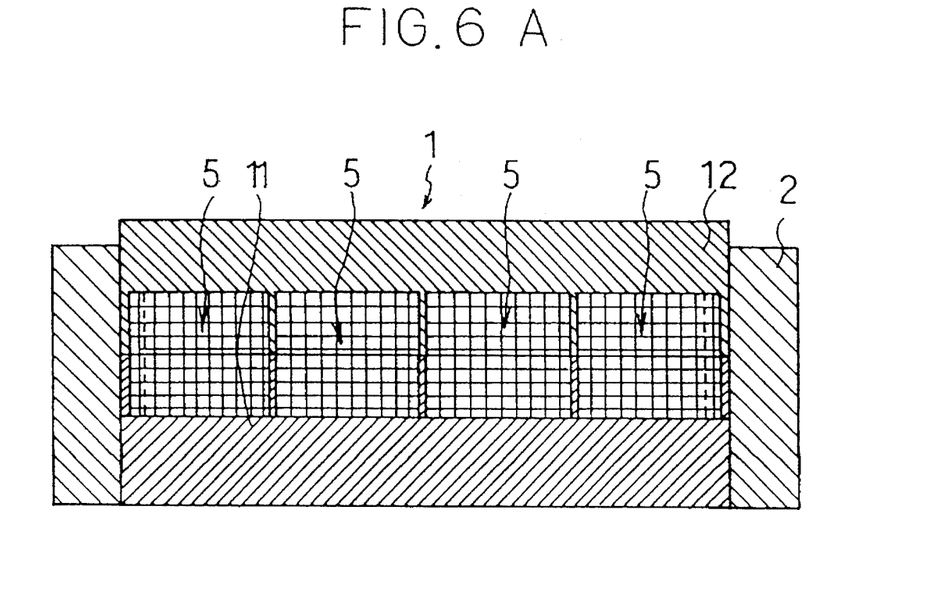
FIG. 6A is a view in longitudinal section showing the molding utensil with the upper mold member pushed down and fitted to the lower mold member inside the outer frame.
Figure 6B:
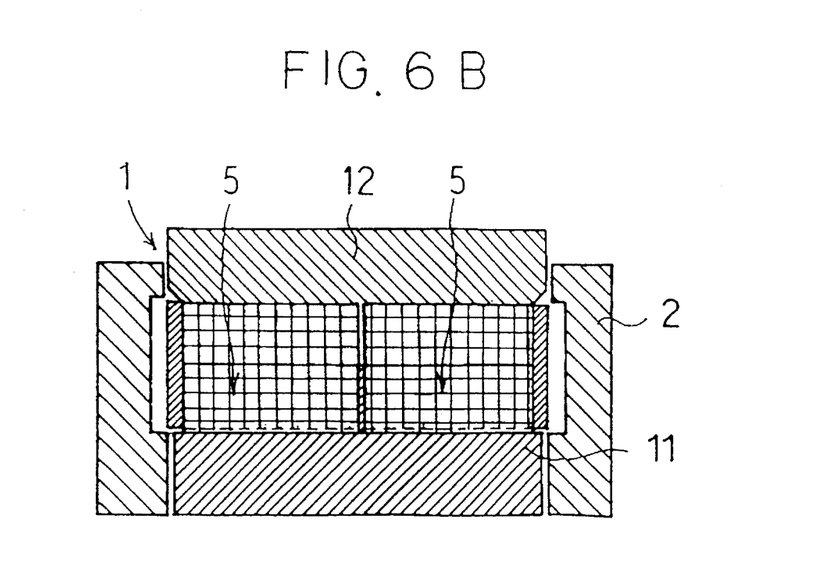
FIG. 6B is a view in cross section of the molding utensil in the same state.
Figure 7A:
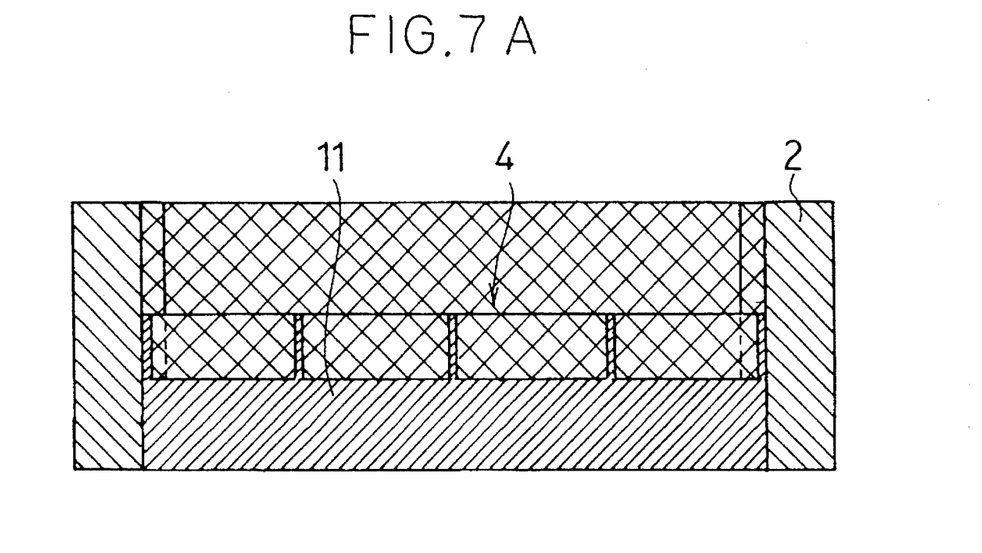
FIG. 7A is a view in longitudinal section showing the molding utensil with the upper mold member removed.
Figure 7B:
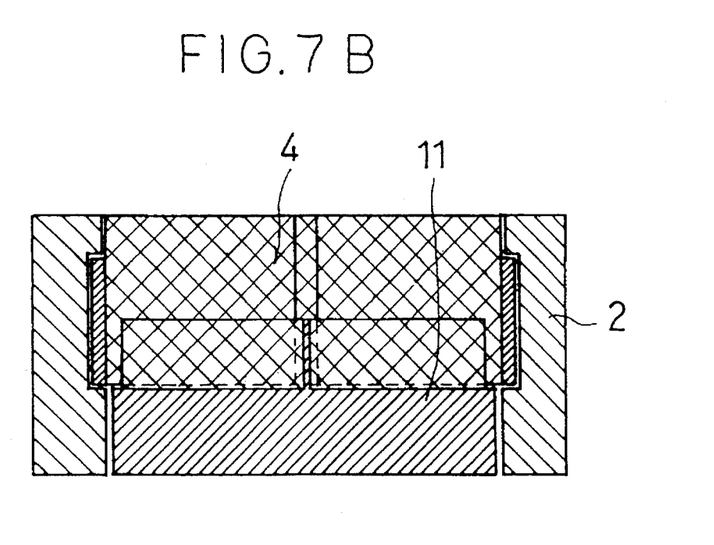
FIG. 7B is a view in cross section of the molding utensil in the same state.

The outer frame 2 has such a depth that when the upper mold member 12 is in its depressed position as fitted to the lower mold member 11 inserted into the outer frame 2 to its bottom with the side mold members 6, 6 in their advanced position within the outer frame as well be described below, the combined volume of the cavities 50 so contoured as shown in FIG. 6 is about 25 to about 35% smaller than the volume of a recess 4 defined by the outer frame 2, the lower mold member 11 fitted in the outer frame 2 to the bottom thereof and the side mold members 6, 6 as situated in their retracted position within the outer frame 2. For a better understanding, the recess 4 is indicated by crisscrossed parallel oblique lines in FIGS. 7, A and B, and the cavities 50 by vertical and horizontal parallel lines in FIGS. 6, A and B. The cavities 50 shown have such a volume that is afforded in the absence of the lower cams 8'.

Sushi rice can be molded by the same procedure as already described using the molding utensil of the invention which comprises a split mold 1 composed of a lower mold member 11 and an upper mold member 12, an outer frame 2 combined with the mold 1, and side mold members 6, 6 added to the combination.

Since the outer frame 2 has the above-mentioned depth, the sushi rice molded has been compacted to about 65 to about 75% of the volume thereof before molding which corresponds to the volume of the recess 4. When the sushi rice thus compacted was tasted and collapsed by holding with fingers, the rice felt compacted to the same degree as the rice balls hand-rolled by skilled cooks.

When the upper mold member 12 is pushed down for molding sushi rice, the side mold members 6, 7 advance by about 5 mm with this movement toward each other under the action of the pairing elements, i.e., the pins 7 and the angular cams 8. Accordingly, the sushi rice is molded not only from above and below but also sideways in the directions in which the side mold members 6, 6 are opposed to each other. When thus molded biaxially, i.e., both vertically and horizontally, the sushi rice can be made into a tasty molding which is compacted to the desired degree and less liable to collapse.

When the upper mold member 12 is pushed down until this member fits to the lower mold member 11 in the case where the cams 8' are provided under the respective cams 8 continuously therewith, the pins 7 come into contact with the respective cams 8' retract the side mold members 6, 6 sidewise in FIG. 1 away from each other within the outer frame 2. Thus, the side mold members 6, 6 are spaced by a slightly increased distance in the final stage of depression of the upper mold member 12. This is the same phenomenon as is produced finally when sushi rice is rolled with hands by skilled cooks, thereby giving an improved degree of compactness to the sushi rice.

When the outer frame 2 is lifted relative to the lower mold member 11, this movement causes the lateral grooves 9 and the pins 10 to raise the side mold members 6, 6, further causing the cams 8 and the pins 7 to raise the upper mold member 12.

In this way, the split mold 1 comprising the lower mold member 11 and the upper mold member 12 can be opened or separated. When the mold 1 is separated, the molded sushi rice can be taken out.

The present invention is not limited only to the foregoing embodiment but can of course be modified within the scope of the invention as defined in the appended claims. For example, the side mold members 6, 6 can be made removable from the outer frame 2 without forming the lateral grooves 9 and pins 10.

As will be apparent from the above description, the molding utensil of the invention for use in preparing nigiri-zushi is adapted to mold sushi rice with the same compactness as when it is hand-rolled by a skilled cook to make tasty rice moldings as desired.

I claim:

1. A sushi rice molding utensil for preparing nigiri-zushi, comprising:
   (a) a split mold having:
      a lower mold member having a plurality of upwardly facing molding cavities which have side openings along at least one side of said lower mold, and
      an upper mold member having a plurality of downwardly facing molding cavities which have side openings along at least one side of said upper mold member,
      said upper mold member being generally vertically movable relative to said lower mold member such that said downwardly facing molding cavities can be moved into alignment with said upwardly facing molding cavities in a fully closed position,
   (b) an outer frame within which the split mold is removably fittable,
   (c) a side mold member which is generally horizontally movable toward said side openings of both said upper and lower molds, said side mold member being fittable within the outer frame,
   (d) at least one cam engagement between (a) one of an angular cam and a pin provided on an end wall of said side mold member and (b) the other of the angular cam and the pin provided on a wall of the upper mold member opposed to said end wall when the upper mold member and said first side mold member are fitted within the outer frame, said at least one cam engagement being sized such that said side mold member is advanced generally horizontally from an outer position to an inner position by about 5 mm towards said side openings of both said upper and lower molds when said upper mold is moved towards said lower mold from a retracted position towards said closed position, and
   (e) wherein a closed volume defined by said aligned upwardly and downwardly facing molding cavities in said closed position and delineated by inner surfaces of said side mold member when in said inner position is about 25% to 35% smaller than an open volume defined by said upwardly facing molding cavities, said inner surfaces of said side mold member in said outer position, and inner surfaces of said outer frame.

2. A sushi rice molding utensil for preparing nigiri-zushi as defined in claim 1, wherein said angular cam is formed from a groove provided in said end wall of said side mold member, said groove has upper and lower angular cam portions (8, 8'), and said upper angular cam portion (8) is provided at an upper half of said end wall of said side mold member.

3. A sushi rice molding utensil for preparing nigiri-zushi as defined in claim 2, wherein said groove is formed with two oppositely angled sections such that when said upper mold is moved towards said lower mold said side mold member initially moves inward towards said cavities until said side mold member reaches said inner position and then said side mold member moves outward away from said cavities, such that in said closed position said side mold member is retracted towards said outer position.

4. A sushi rice molding utensil for preparing nigiri-zushi, comprising:

(a) a split mold having:
  a lower mold member having a plurality of upwardly facing molding cavities which have side openings along at least one side of said lower mold, and
  an upper mold member having a plurality of downwardly facing molding cavities which have side openings along at least one side of said upper mold member,
  said upper mold member being generally vertically movable relative to said lower mold member such that said downwardly facing molding cavities can be moved into alignment with said upwardly facing molding cavities in a fully closed position, (b) an outer frame within which the split mold is removably fittable, (c) two oppositely facing side mold members which are generally horizontally movable toward said side openings of both said upper and lower molds, said first and second side mold members being fittable within the outer frame, (d) at least one cam engagement between (a) one of an angular cam and a pin provided on an end wall of each said side mold members and (b) the other of the angular cam and the pin provided on a wall of the upper mold member opposed to said end wall when the upper mold member and said side mold members are fitted within the outer frame, said at least one cam engagement being sized such that said side mold members are advanced generally horizontally from an outer position to an inner position by about 5 mm towards said side openings of both said upper and lower molds when said upper mold is moved towards said lower mold from a retracted position towards said closed position, and (e) wherein a closed volume defined by said aligned upwardly and downwardly facing molding cavities in said closed position and delineated by inner surfaces of said side mold members when in said inner position is about 25% to 35% smaller than an open volume defined by said upwardly facing molding cavities, said inner surfaces of said side mold members in said outer position, and inner surfaces of said outer frame.

5. A sushi rice molding utensil for preparing nigiri-zushi as defined in claim 4, wherein said angular cams are each formed from a groove provided in said end walls of said side mold members, said groove has upper and lower angular cam portions (8, 8'), and said upper angular cam portion (8) is provided at an upper half of said end wall of each said side mold member.

6. A sushi rice molding utensil for preparing nigiri-zushi as defined in claim 5, wherein said grooves are each formed with two oppositely angled sections such that when said upper mold is moved towards said lower mold said side mold members initially move inward towards one another until said side mold members reach said inner position and then said side mold members move outward away from one another, such that in said closed position said side mold members are retracted towards said outer position.

* * * * *